US012165572B2

(12) United States Patent
Li et al.

(10) Patent No.: US 12,165,572 B2
(45) Date of Patent: Dec. 10, 2024

(54) DISPLAY PANEL AND DISPLAY DEVICE

(71) Applicant: Xiamen Tianma Display Technology Co., Ltd., Xiamen (CN)

(72) Inventors: Jieliang Li, Xiamen (CN); Ping An, Xiamen (CN); Guoxing Chen, Xiamen (CN); Yuping Xu, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/103,690

(22) Filed: Jan. 31, 2023

(65) Prior Publication Data

US 2023/0282157 A1 Sep. 7, 2023

(30) Foreign Application Priority Data

May 18, 2022 (CN) ........................ 202210551161.4

(51) Int. Cl.
*G09G 3/32* (2016.01)

(52) U.S. Cl.
CPC ....... *G09G 3/32* (2013.01); *G09G 2320/0247* (2013.01); *G09G 2320/0666* (2013.01)

(58) Field of Classification Search
CPC ............. G09G 3/32; G09G 2320/0247; G09G 2320/0666
See application file for complete search history.

(56) References Cited

U.S. PATENT DOCUMENTS

2021/0151483 A1* 5/2021 Feng .................... G09G 3/3225
2021/0158755 A1* 5/2021 Li ........................ G09G 3/3266
2024/0071289 A1* 2/2024 Li ........................ G09G 3/3233

* cited by examiner

*Primary Examiner* — Kenneth B Lee, Jr.
(74) *Attorney, Agent, or Firm* — KDW Firm PLLC

(57) ABSTRACT

Provided are a display panel and a display device. The display panel includes a first display region, a second display region and pixel circuits. The pixel circuits include a first pixel circuit and a second pixel circuit. The first pixel circuit is configured to provide a drive current for a light-emitting element in the first display region. The second pixel circuit is configured to provide a drive current for a light-emitting element in the second display region. The pixel circuits further include at least one bias adjustment module, each of which is configured to provide a bias adjustment signal for a respective one drive transistor. A preset electrode of a drive transistor in the first pixel circuit is connected to one bias adjustment module and a preset electrode of a drive transistor in the second pixel circuit is connected to no bias adjustment module.

20 Claims, 9 Drawing Sheets

DISPLAY PANEL AND DISPLAY DEVICE

CROSS-REFERENCE TO RELATED APPLICATION

This application claims priority to Chinese Patent Application No. 202210551161.4 filed May 18, 2022, the disclosure of which is incorporated herein by reference in its entirety.

TECHNICAL FIELD

The present disclosure relates to the field of display technologies, in particular, to a display panel, and a display device including the display panel.

BACKGROUND

A pixel circuit is the key component in a display panel and plays an important role in providing a drive current for a light-emitting element of the display panel. At present, with the increasing number of functions integrated into the display panel, different regions in the display panel are often required to implement different functions. To match different functions, different pixel circuits need to be set in different display regions, so as to meet the display requirements of different display regions.

Typically, the pixel circuit includes a transistor and a capacitor element that receive various types of signals and play different roles under the control of the various types of signals. To meet the display requirements of different display regions, components such as the transistor and the capacitor element in the pixel circuit and the various types of signals received by the components often need differentiated designs. However, how to perform differentiated designs on the components and the signals to meet the functions of different display regions is one of the research hotspots in this field.

SUMMARY

In view of this, the present disclosure provides a display panel and a display device. Differentiated designs are performed on components or the received signals of pixel circuits in different display regions of the display panel to meet the display requirements of the different display regions.

An embodiment of the present application provides a display panel. The display panel includes a first display region, a second display region, and pixel circuits.

The pixel circuits include a first pixel circuit and a second pixel circuit. The first pixel circuit is configured to provide a drive current for a light-emitting element in the first display region. The second pixel circuit is configured to provide a drive current for a light-emitting element in the second display region.

The pixel circuits include at least one bias adjustment module. Each of the at least one bias adjustment module is configured to provide a bias adjustment signal for a respective one drive transistor. A preset electrode of a drive transistor in the first pixel circuit is connected to one bias adjustment module. A preset electrode of a drive transistor in the second pixel circuit is connected to no bias adjustment module.

An embodiment of the present application provides a display device including the preceding display panel.

In the display panel and the display device provided by the present application, the display panel includes the first display region and the second display region, the preset electrode of the first pixel circuit configured to provide the drive current for the light-emitting element in the first display region is connected to one bias adjustment module, and the preset electrode of the second pixel circuit configured to provide the drive current for the light-emitting element in the second display region is connected to no bias adjustment module. Since the bias adjustment signal is a signal received by a pixel circuit for adjusting a bias state of a drive transistor, whether to receive the bias adjustment signal and to which electrode the bias adjustment signal is input both affect the operating process and the structure configuration of the pixel circuit. If the first display region and the second display region in the display panel each have different requirements for the setting positions and the structure layout of the pixel circuits to achieve different functions, the setting position of the bias adjustment module and whether to set the bias adjustment module are each separately and independently designed in the first pixel circuit and the second pixel circuit, so as to better meet the respective display requirements of the first display region and the second display region.

DETAILED DESCRIPTION

To obtain a clearer understanding of objects, features and advantages of the present disclosure, the present disclosure will be further described below in conjunction with the drawings and embodiments.

It is to be noted that details are set forth below to facilitate a thorough understanding of the present disclosure. However, the present disclosure may be implemented by various embodiments different from the embodiments described herein, and those skilled in the art may make similar generalizations without departing from the spirit of the present disclosure. Therefore, the present disclosure is not limited to the embodiments disclosed below.

An embodiment of the present application provides a display panel. The display panel may be an organic light-emitting diode display panel, a micro light-emitting diode display panel, or other types of display panels.

Figure 1:
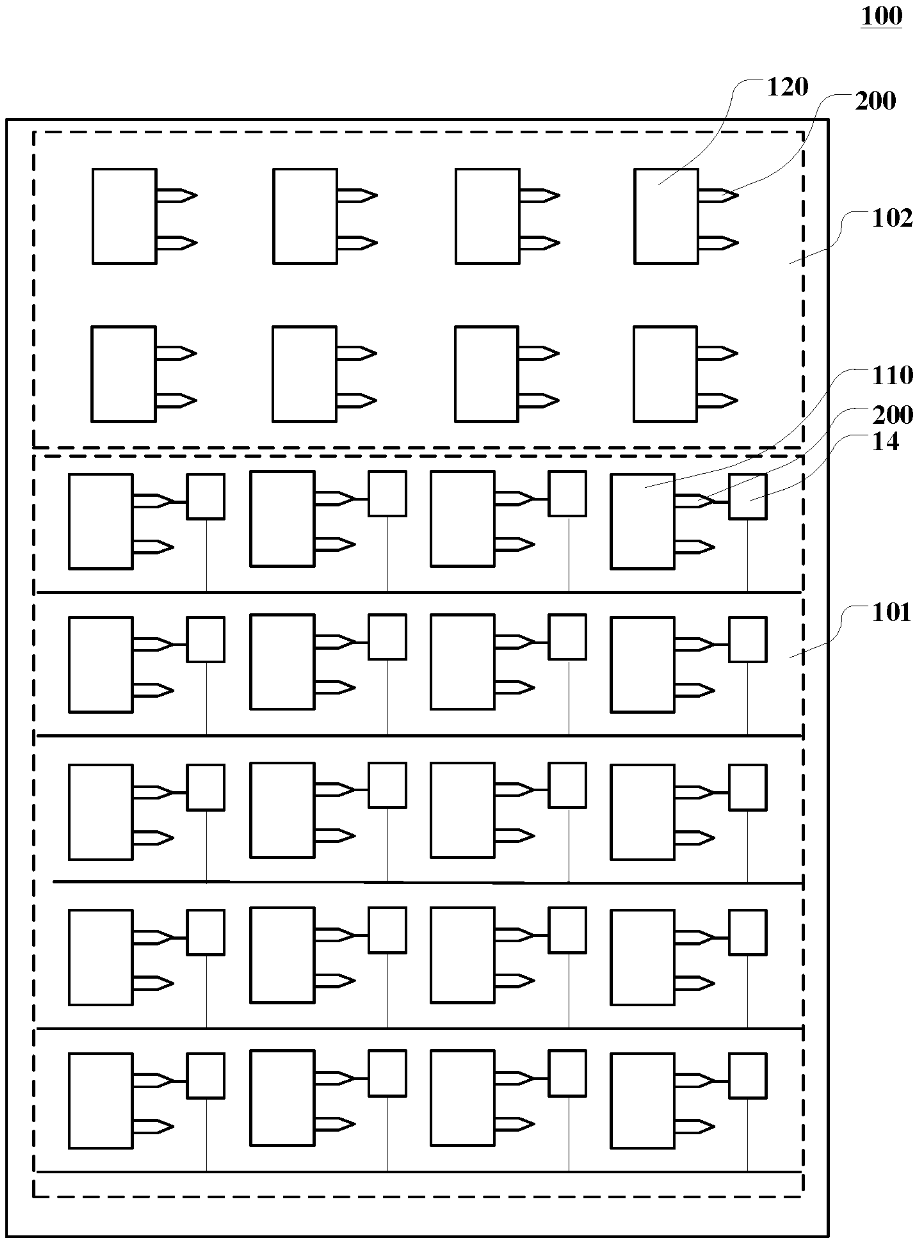
FIG. 1 is a schematic diagram of a display panel according to an embodiment of the present application.
Figure 2:
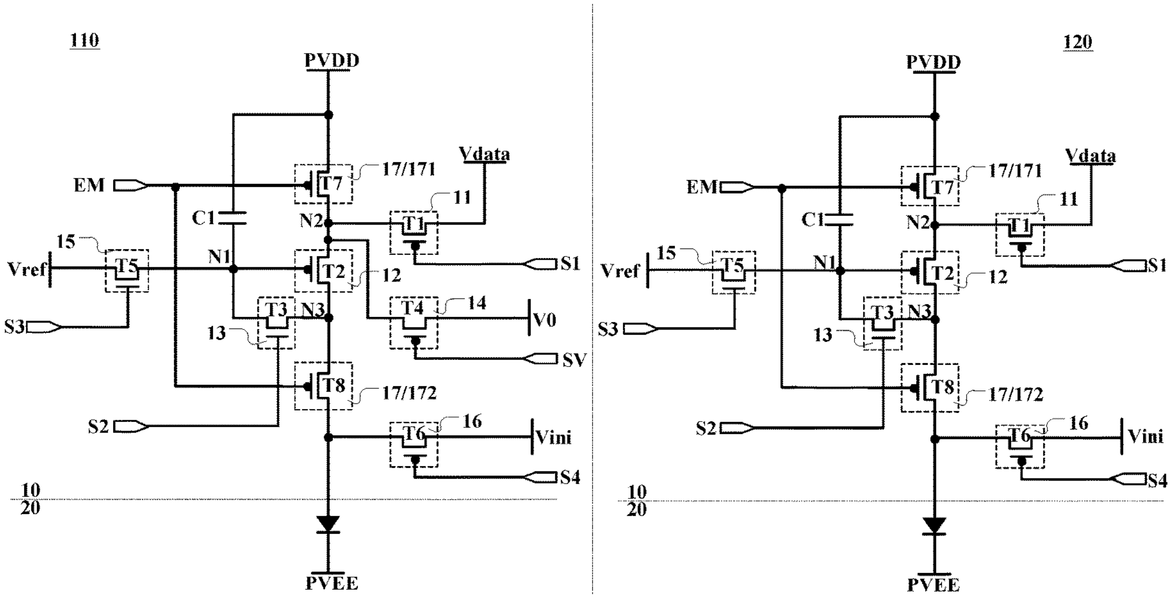
FIG. 2 is a schematic diagram showing a comparison of a first pixel circuit and a second pixel circuit according to an embodiment of the present application.
Figure 3:
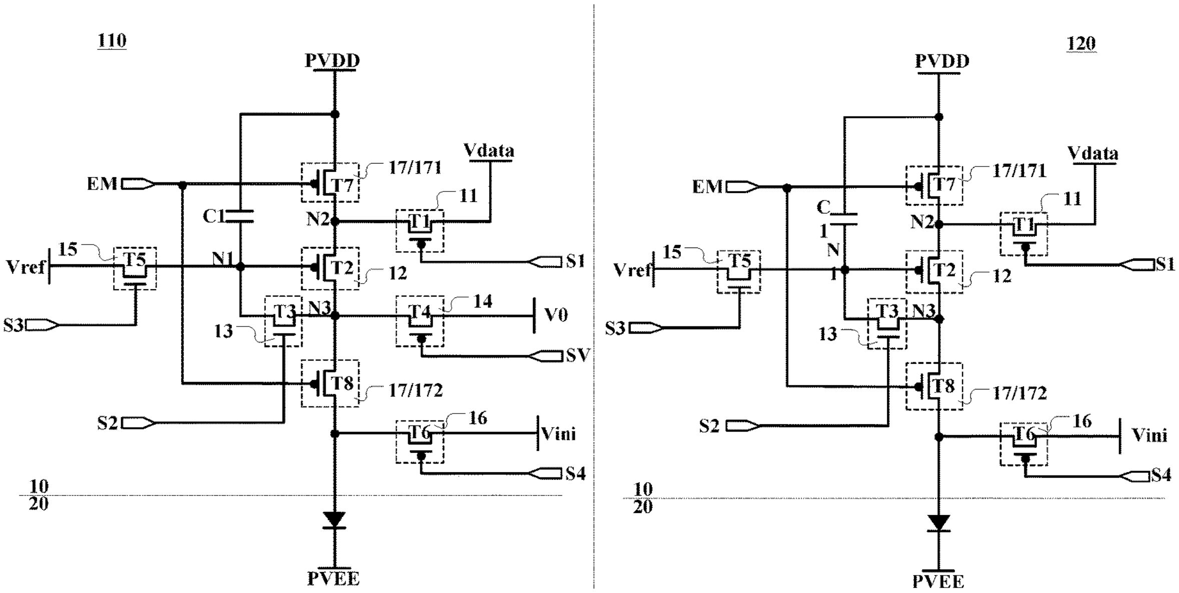
FIG. 3 is another schematic diagram showing a comparison of a first pixel circuit and a second pixel circuit according to an embodiment of the present application.
Figure 4:
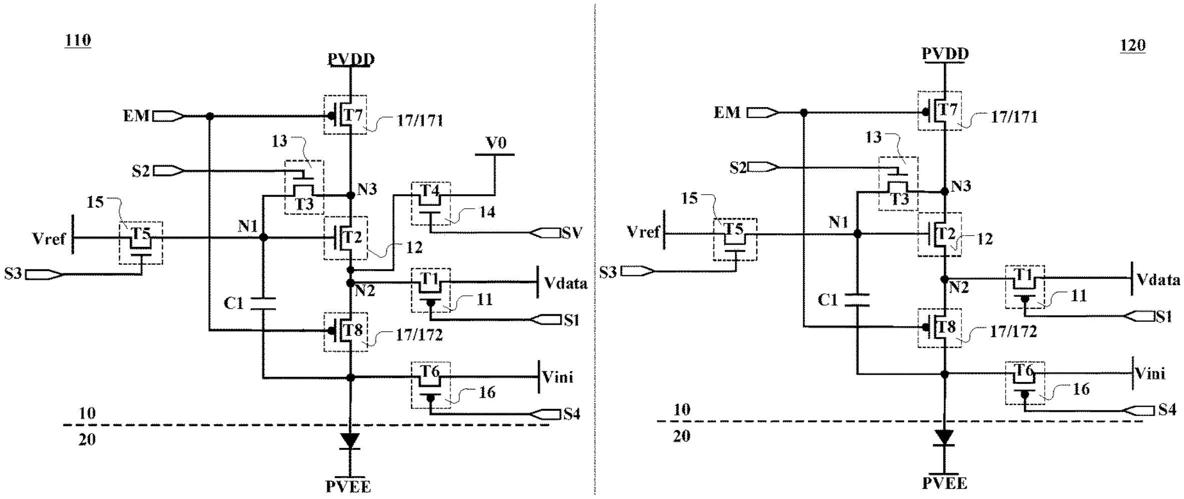
FIG. 4 is another schematic diagram showing a comparison of a first pixel circuit and a second pixel circuit according to an embodiment of the present application.
Figure 5:
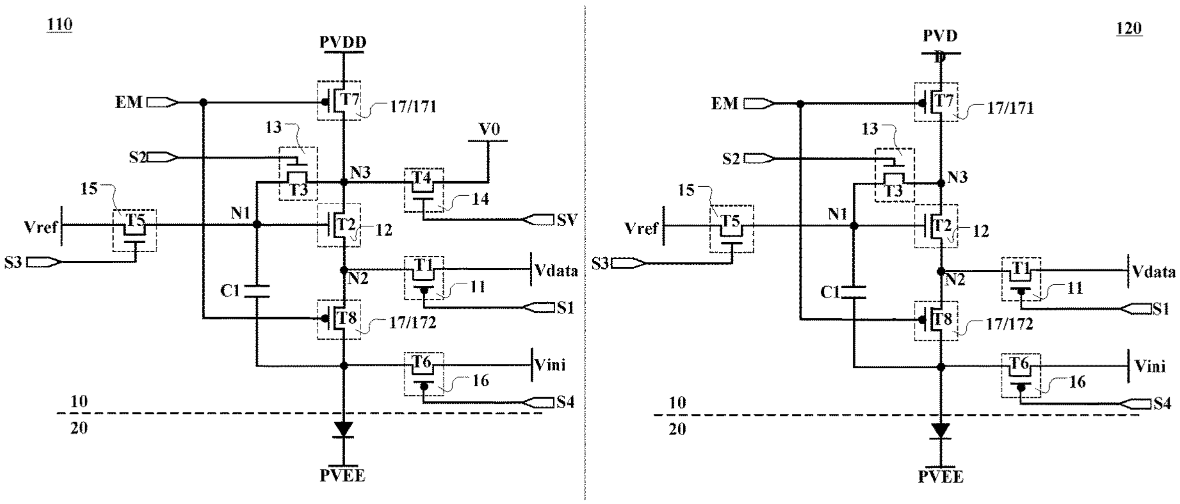
FIG. 5 is another schematic diagram showing a comparison of a first pixel circuit and a second pixel circuit according to an embodiment of the present application.
Figure 6:
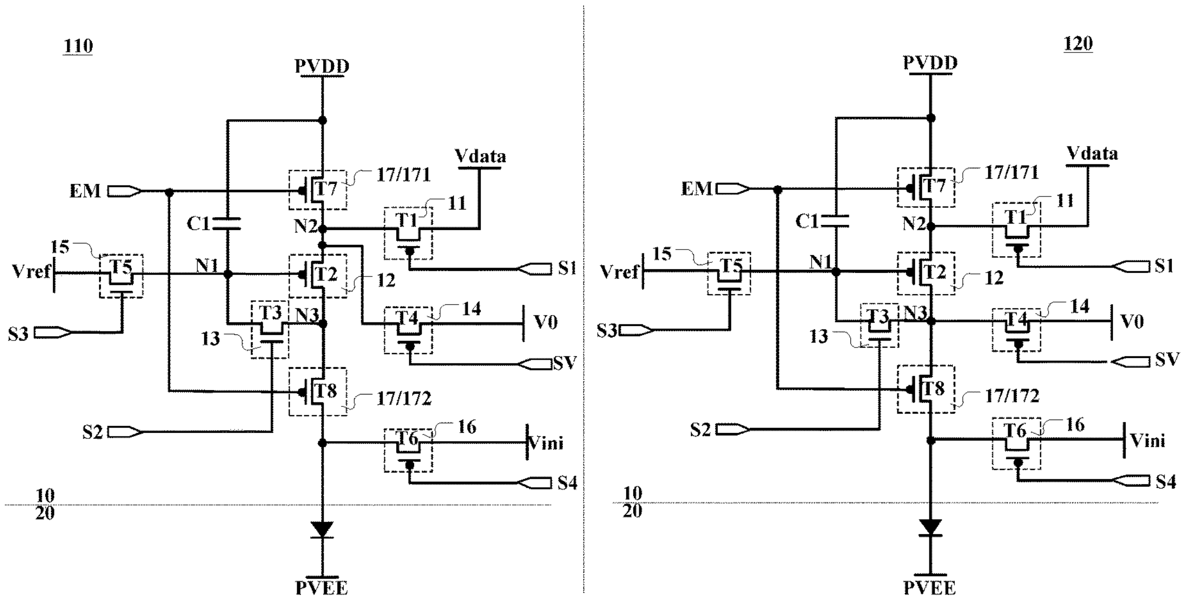
FIG. 6 is another schematic diagram showing a comparison of a first pixel circuit and a second pixel circuit according to an embodiment of the present application.
Figure 7:
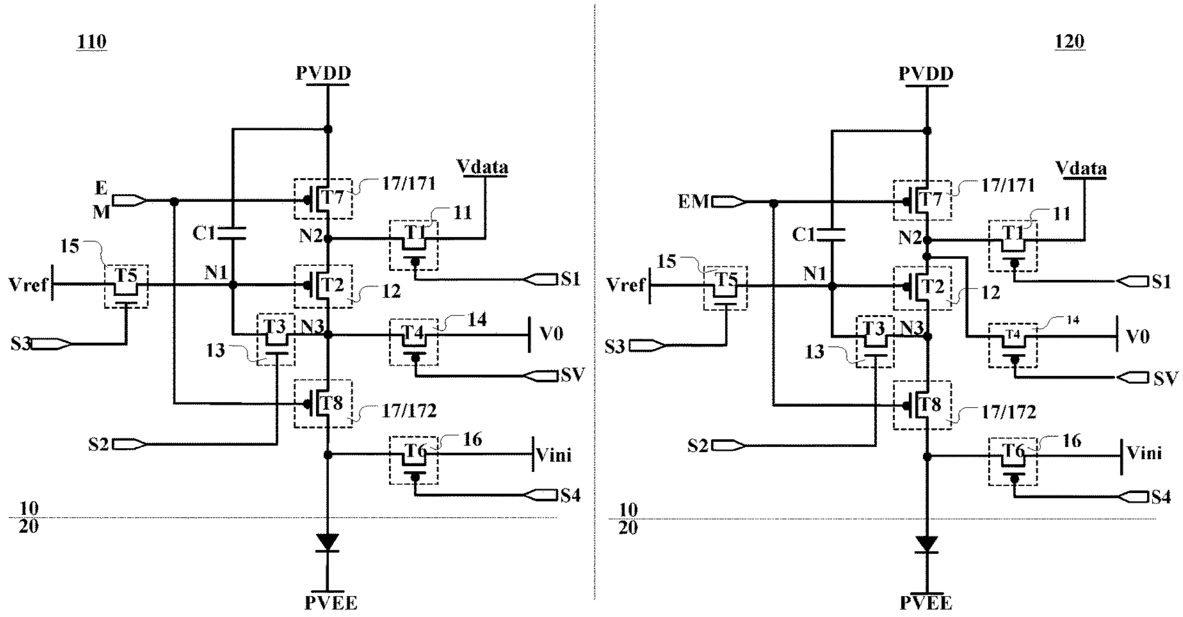
FIG. 7 is another schematic diagram showing a comparison of a first pixel circuit and a second pixel circuit according to an embodiment of the present application.
Figure 8:
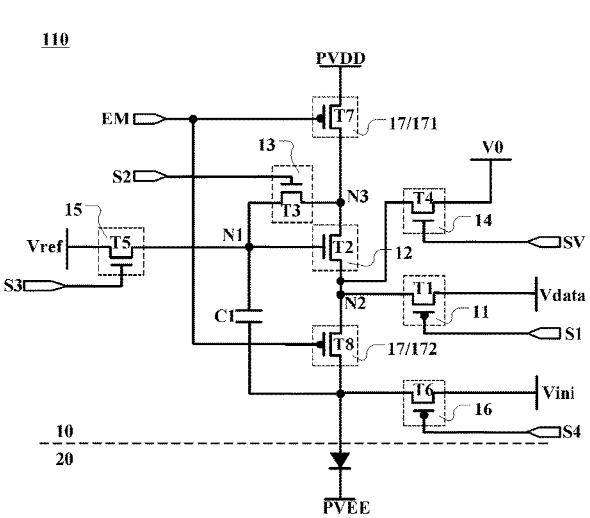
FIG. 8 is another schematic diagram showing a comparison of a first pixel circuit and a second pixel circuit according to an embodiment of the present application.
Figure 9:
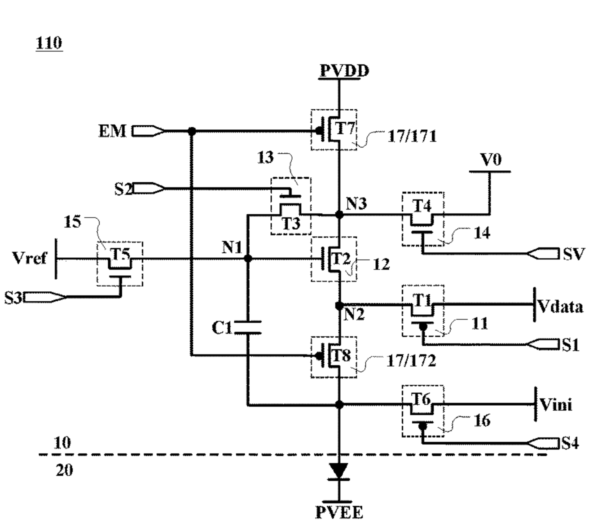
FIG. 9 is another schematic diagram showing a comparison of a first pixel circuit and a second pixel circuit according to an embodiment of the present application.

Referring to FIGS. 1 to 9, FIG. 1 is a schematic diagram of a display panel according to an embodiment of the present application, FIG. 2 is a schematic diagram showing a comparison of a first pixel circuit and a second pixel circuit according to an embodiment of the present application, FIG. 3 is another schematic diagram showing a comparison of a first pixel circuit and a second pixel circuit according to an embodiment of the present application, FIG. 4 is another schematic diagram showing a comparison of a first pixel circuit and a second pixel circuit according to an embodiment of the present application, FIG. 5 is another schematic diagram showing a comparison of a first pixel circuit and a second pixel circuit according to an embodiment of the present application, FIG. 6 is another schematic diagram showing a comparison of a first pixel circuit and a second pixel circuit according to an embodiment of the present application, FIG. 7 is another schematic diagram showing a comparison of a first pixel circuit and a second pixel circuit according to an embodiment of the present application, FIG. 8 is another schematic diagram showing a comparison of a first pixel circuit and a second pixel circuit according to an embodiment of the present application, and FIG. 9 is another schematic diagram showing a comparison of a first pixel circuit and a second pixel circuit according to an embodiment of the present application. A display panel 100 includes a first display region 101, a second display region 102, and pixel circuits 10. The pixel circuit 10 includes a data write module 11, a drive module 12, and a compensation module 13. The drive module 12 includes a drive transistor T2. The drive transistor T2 is configured to provide a drive current for a light-emitting element 20 of the display panel 100. The data write module 11 is connected to a first electrode (i.e., an N2 node) of the drive transistor T2 and is configured to provide a data signal for the drive transistor T2. The compensation module 13 is connected between a gate (i.e., an N1 node) of the drive transistor T2 and a second electrode (i.e., an N3 node) of the drive transistor T2 and is configured to compensate a threshold voltage of the drive transistor T2. The pixel circuits 10 include first pixel circuits 110 and second pixel circuits 120. The first pixel circuit 110 is configured to provide the drive current for the light-emitting element in the first display region 101. The second pixel circuit 120 is configured to provide the drive current for the light-emitting element in the second display region 102. The pixel circuit 10 also includes a bias adjustment module 14 configured to provide a bias adjustment signal for the drive transistor T2. In the first pixel circuit 110, a preset electrode 200 of the drive transistor T2 is connected to the bias adjustment module 14. In the second pixel circuit 120, the preset electrode 200 of the drive transistor T2 is connected to no bias adjustment module 14.

It can be seen from the above description that the display panel 100 provided by the present application includes the first display region 101 and the second display region 102, the preset electrode 200 of the first pixel circuit 110 configured to provide the drive current for the light-emitting element in the first display region 101 is connected to the bias adjustment module 14, and the preset electrode 200 of the second pixel circuit 120 configured to provide the drive current for the light-emitting element in the second display region 102 is connected to no bias adjustment module 14. Since the bias adjustment signal is a signal received by the pixel circuit 10 for adjusting the bias state of the drive transistor, whether to receive the bias adjustment signal and to which electrode the bias adjustment signal is input both affect the operating process and the structure configuration of the pixel circuit 10. If the first display region 101 and the second display region 102 in the display panel 100 each have different requirements for the setting positions and the structure layout of the pixel circuits and the magnitude of the bias adjustment signal to achieve different functions, the setting position of the bias adjustment module and whether to set the bias adjustment module are each separately and independently designed in the first pixel circuit 110 and the second pixel circuit 120, so as to better meet the respective display requirements of the first display region 101 and the second display region 102.

It is to be noted that, as shown in FIGS. 2 to 9, in this embodiment, the pixel circuit 10 may further include a reset module 15 configured to provide a reset signal Vref for the gate of the drive transistor T2, an initialization module 16 configured to provide an initialization signal Vini for the light-emitting element 20, and a light-emitting control module 17 configured to selectively allowing the light-emitting element 20 to enter a light-emitting stage. In an embodiment, the light-emitting control module 17 includes a first light-emitting control module 171 and a second light-emitting control module 172. The first light-emitting control module 171 is connected between a first power signal terminal and one electrode of the drive transistor T2. The second light-emitting control module 172 is connected between another electrode of the drive transistor T2 and the light-emitting element 20.

In an embodiment, a control terminal of the data write module 11 receives a first scan signal S1. The first scan signal S1 controls the data write module 11 to turn on and off. A control terminal of the compensation module 13 receives a second scan signal S2. The second scan signal S2 controls the compensation module 13 to turn on and off. A control terminal of the bias adjustment module 14 receives a bias adjustment control signal SV The bias adjustment control signal SV controls the bias adjustment module 14 to turn on and off. A control terminal of the reset module 15 receives a third scan signal S3. The third scan signal S3 controls the reset module 15 to turn on and off. A control terminal of the initialization module 16 receives a fourth scan signal S4. The fourth scan signal S4 controls the initialization module 16 to turn on and off. A control terminal of the light-emitting control module 17 receives a light-emitting control signal EM. The light-emitting control signal EM controls the light-emitting control module 17 to turn on and off.

In addition, in an embodiment, the data write module 11 includes a data write transistor T1. The first scan signal S1 controls the data write transistor T1 to turn on and off. The compensation module 13 includes a compensation transistor T3. The second scan signal S2 controls the compensation transistor T3 to turn on and off. The bias adjustment module 14 includes a bias adjustment transistor T4. The bias adjustment control signal SV controls the bias adjustment transistor T4 to turn on and off. The reset module 15 includes a reset transistor T5. The third scan signal S3 controls the reset transistor T5 to turn on and off. The initialization module 16 includes an initialization transistor T6. The fourth scan signal S4 controls the initialization transistor T6 to turn on and off. The first light-emitting control module 171 includes a first light-emitting control transistor T7. The second light-emitting control module 172 includes a second light-emitting control transistor T8. The light-emitting control signal EM controls the first light-emitting control transistor T7 and the second light-emitting control transistor T8 to turn on and off.

At least two of the first scan signal S1, the second scan signal S2, the third scan signal S3, the fourth scan signal S4, the bias adjustment control signal SV and the light-emitting control signal EM may be the same signals. For example, when the bias adjustment transistor T4 and the initialization transistor T6 are of the same type, the bias adjustment control signal SV and the fourth scan signal S4 may be the same signals.

In an embodiment, as shown in FIGS. 2 to 5, the preset electrode 200 is the first electrode of the drive transistor T2 or the second electrode of the drive transistor T2. In the first pixel circuit 110, the bias adjustment module 14 is connected to the preset electrode of the drive transistor T2. In the second pixel circuit 120, the first electrode (the N2 node) and the second electrode (the N3 node) of the drive transistor T2 are connected to no bias adjustment module 14.

In this embodiment, the first display region 101 and the second display region 102 have different display requirements. For example, the first display region 101 needs to have a better display effect when data in the first display region 101 is refreshed both at a high frequency and a low frequency, while the second display region 102 includes a transmissive region and needs the space occupied by the pixel circuits to be as small as possible so that the first display region 101 and the second display region 102 have different display requirements, making the two regions also have different requirements for adjusting the bias state. For the first display region 101, the bias adjustment module 14 is set to provide the bias adjustment signal for the drive transistor T2, and adjust the bias state of the drive transistor T2, so as to avoid the flicker problem on the display panel, especially the flicker problem that may occur when data is refreshed at a low frequency. No bias adjustment module 14 is set in the second display region 102, thereby saving the space occupied by the components in the pixel circuits 10, and making it easy for the second display region 102 to set the transmissive region for achieving other functions, such as an under-screen imaging function. This part will be described hereinafter.

As shown in FIGS. 2 and 3, the drive transistor T2 is a positive-channel metal oxide semiconductor (PMOS) type transistor, in the first pixel circuit 110, the bias adjustment module 14 is connected to the first electrode (the N2 node) of the drive transistor T2 or the second electrode (the N3 node) of the drive transistor T2, and in the second pixel circuit 120, the first electrode and the second electrode of the drive transistor T2 are connected to no bias adjustment module 14. In FIG. 2, the bias adjustment module 14 is connected to the first electrode (the N2 node) of the drive transistor T2. In FIG. 3, the bias adjustment module 14 is connected to the second electrode (the N3 node) of the drive transistor T2.

As shown in FIGS. 4 and 5, the drive transistor T2 is a negative-channel metal oxide semiconductor (NMOS) type transistor. In the first pixel circuit 110, the bias adjustment module 14 is connected to the first electrode (the N2 node) of the drive transistor T2 or the second electrode (the N3 node) of the drive transistor T2. In the second pixel circuit 120, the first electrode and the second electrode of the drive transistor T2 are connected to no bias adjustment module 14. In FIG. 4, the bias adjustment module 14 is connected to the first electrode (the N2 node) of the drive transistor T2. In FIG. 5, the bias adjustment module 14 is connected to the second electrode (the N3 node) of the drive transistor T2.

In an embodiment, as shown in FIGS. 6 and 8, the preset electrode 200 is the first electrode (the N2 node) of the drive transistor T2, and in the second pixel circuit 120, the bias adjustment module 14 is connected to the second electrode (the N3 node) of the drive transistor T2. As shown in FIG. 6, the drive transistor T2 is the PMOS type transistor. As shown in FIG. 8, the drive transistor T2 is the NMOS type transistor. Alternatively, as shown in FIGS. 7 and 9, the preset electrode 200 is the second electrode (the N3 node) of the drive transistor T2, and in the second pixel circuit 120, the bias adjustment module 14 is connected to the first electrode (the N2 node) of the drive transistor T2. As shown in FIG. 7, the drive transistor T2 is the PMOS type transistor. As shown in FIG. 8, the drive transistor T2 is the NMOS type transistor.

As shown in FIGS. 2, 3, 6 and 7, when the drive transistor T2 is the PMOS type transistor, the pixel circuit 10 further includes a storage capacitor C1, where a first electrode of the storage capacitor C1 is connected to the first power signal terminal, and a second electrode of the storage capacitor C1 is connected to the gate of the drive transistor T2 and configured to store signals transmitted to the gate of the drive transistor T2. As shown in FIGS. 4, 5, 8 and 9, when the drive transistor T2 is the NMOS type transistor, the pixel circuit 10 further includes a storage capacitor C1, where a first electrode of the storage capacitor C1 is connected to the light-emitting element 20, and a second electrode of the storage capacitor C1 is connected to the gate of the drive transistor T2 and configured to store the signals transmitted to the gate of the drive transistor T2.

Figure 10:
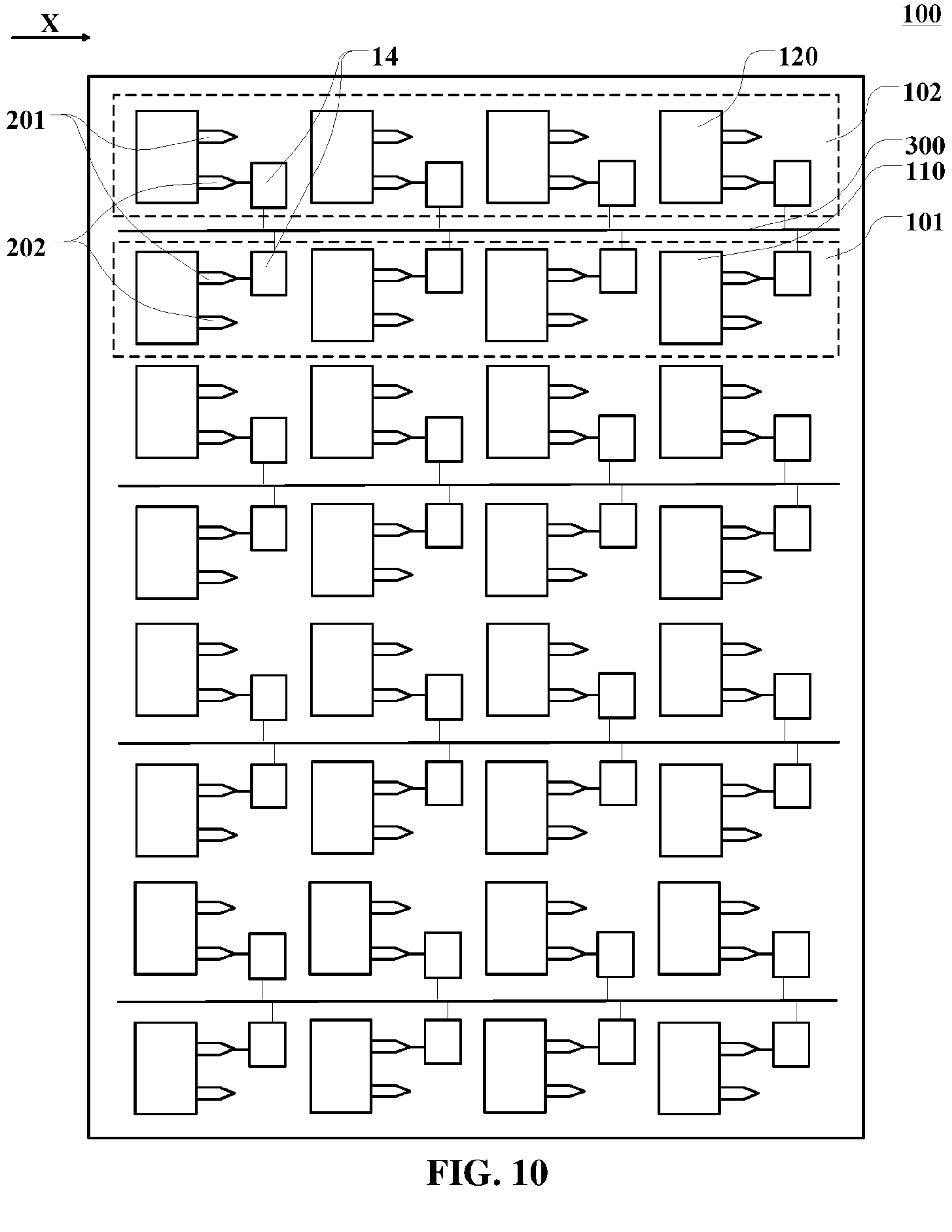
FIG. 10 is a schematic diagram of another display panel according to an embodiment of the present application.

Referring to FIG. 10, FIG. 10 is a schematic diagram of another display panel according to an embodiment of the present application. In a first display region 101, one of a first electrode 201 (an N2 node) or a second electrode 202 (an N3 node) of a drive transistor T2 in a first pixel circuit 110 is connected to a bias adjustment module 14, and in a second display region 102, the other of the first electrode 201 (the N2 node) or the second electrode 202 (the N3 node) of the drive transistor T2 in a second pixel circuit 120 is connected to a bias adjustment module 14. In an embodiment, the display panel 100 includes bias adjustment signal lines 300 for transmitting bias adjustment signals. The bias adjustment signal lines 300 extend in a first direction X. The first pixel circuit 110 and the second pixel circuit 120 are located on one side and another side of the bias adjustment signal line 300 respectively. The bias adjustment signal line 300 provides the bias adjustment signals to both the first pixel circuit 110 and the second pixel circuit 120.

In the preceding design, in the first pixel circuit 110, the first electrode 201 of the drive transistor T2 is close to the bias adjustment signal 300; and in the second pixel circuit 120, the second electrode 202 of the drive transistor T2 is close to the bias adjustment signal 300. In this manner, the first display region 101 and the second display region 102 can be alternately set in the display panel. The bias adjustment signals are provided for a row of first pixel circuits 110 and a row of second pixel circuits 120 through one bias adjustment signal line 300 so that the number of bias adjustment signal lines in the display panel can be reduced by half, and thus the trace space of the display panel can be greatly saved.

Figure 11:
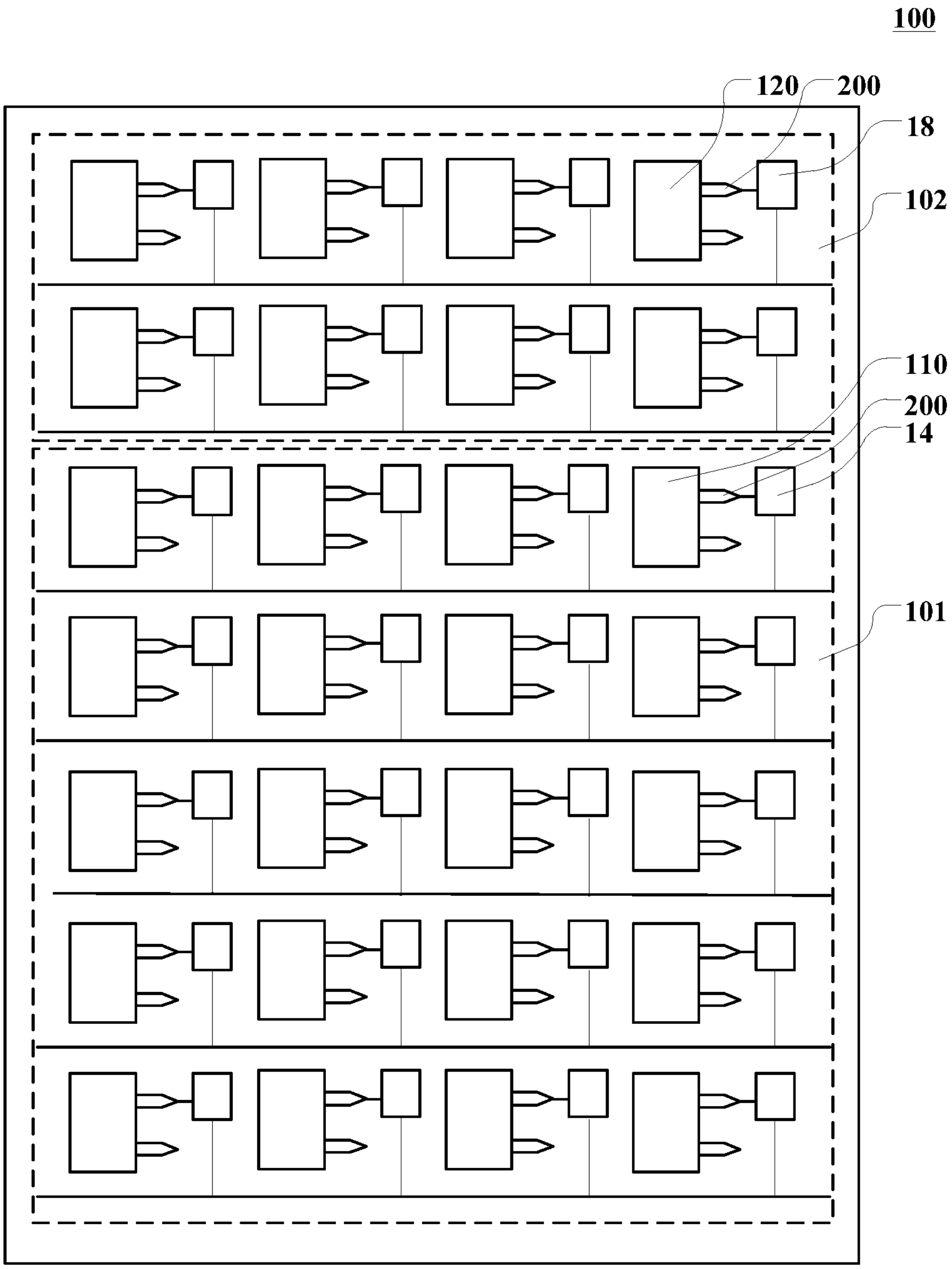
FIG. 11 is a schematic diagram of another display panel according to an embodiment of the present application.

Referring to FIG. 11, FIG. 11 is a schematic diagram of another display panel according to an embodiment of the present application. In a first pixel circuit 110, a preset electrode of a drive transistor T2 is connected to a bias adjustment module 14; and in a second pixel circuit 120, a preset electrode of a drive transistor T2 is connected to a virtual bias adjustment module 18. The virtual bias adjustment module 18 does not provide a bias adjustment signal for the drive transistor T2.

Since a first display region 101 and a second display region 102 are located on the same display panel, considering the aspect of simplifying the preparation, the first pixel circuit 110 of the first display region 101 and the second pixel circuit 120 of the second display region 102 are easy to be prepared by using the same process. From this viewpoint, the first pixel circuit 110 and the second pixel circuit 120 may have the same integral structure and be made by using the same process during the preparation. However, to meet different display requirements of the first display region 101 and the second display region 102, the first pixel circuit 110 may receive the bias adjustment signal and the second pixel circuit 120 may not receive the bias adjustment signal. In this manner, the second pixel circuit 120 may be connected to the virtual bias adjustment module 18. The virtual bias adjustment module 18 and the bias adjustment module 14 may have the same integral structure so that the first pixel circuit 110 and the second pixel circuit 120 are prepared through one process but the virtual bias adjustment module 18 may not provide the bias adjustment signal for the second pixel circuit 120. In some cases, the virtual bias adjustment module 18 is not connected to a bias adjustment signal line, and does not receive the bias adjustment signal. In other cases, the control terminal of the virtual bias adjustment module 18 does not receive a control signal and the virtual bias adjustment module 18 is not turned on. In this manner, the first pixel circuit 110 and the second pixel circuit 120 can be prepared by using the same process and the bias states of the first pixel circuit 110 and the second pixel circuit 120 can be separately adjusted.

In an embodiment, the first display region 101 includes a light-emitting element that emits light of a first color, and the second display region includes a light-emitting element that emits light of a second color. The first color and the second color are different colors.

In the display panel, light-emitting elements of different colors tend to have different turn-on voltages, and to achieve the same brightness, magnitudes of drive currents required by the light-emitting elements of different colors are different. Therefore, drive transistors of pixel circuits corresponding to the light-emitting elements of different colors tend to have different settings. For example, the drive transistors have different width-to-length ratios. The width-to-length ratio of the drive transistor is also a factor that affects the bias state of the drive transistor. Therefore, for the drive transistors having different width-to-length ratios, the pixel circuits having different bias conditions can be selected.

In an embodiment, the light of the first color has a wavelength of $\lambda 1$, and the light of the second color has a wavelength of $\lambda 2$, where $\lambda 1 < \lambda 2$.

Typically, in the display panel, the smaller the wavelength of the light emitted by the light-emitting element, the higher the energy of the light emitted by the light-emitting element, and the larger the turn-on voltage and the drive current required by the light-emitting element, so the bias state of the drive transistor may be more severe. Therefore, the first pixel circuit 110 including the bias adjustment module 14 may be set for the light-emitting element that emits the light of the first color, and the second pixel circuit 120 not including the bias adjustment module 14 may be set for the light-emitting element that emits the light of the second color; alternatively, the first pixel circuit 110 in which the bias adjustment module is connected to one of the first electrode or the second electrode may be set for the light-emitting element that emits the light of the first color, and the second pixel circuit 120 in which the bias adjustment module is connected to the other one of the first electrode or the second electrode may be set for the light-emitting element that emits the light of the second color. Apparently, in some other cases, when the condition permits, it may be $\lambda 1 > \lambda 2$, depending on the specific cases.

Figure 12:
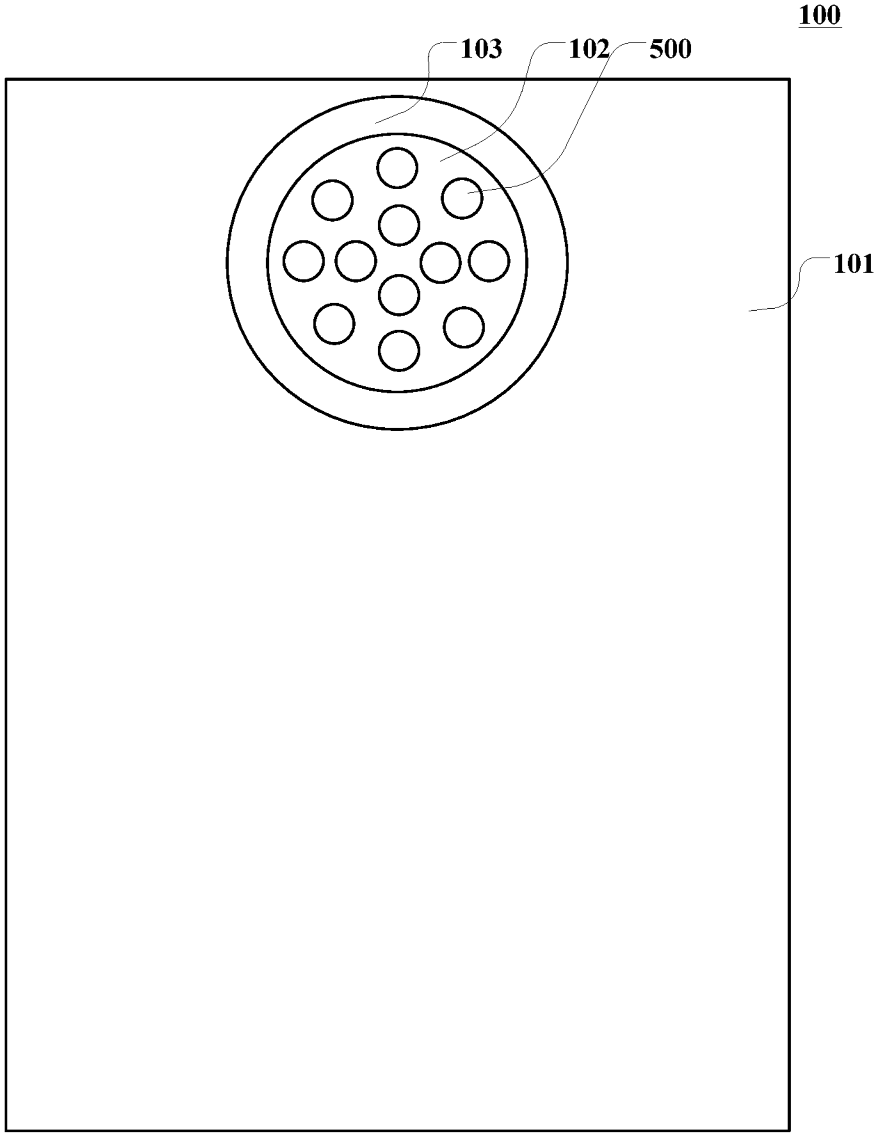
FIG. 12 is a schematic diagram of another display panel according to an embodiment of the present application.

Referring to FIG. 12, FIG. 12 is a schematic diagram of another display panel according to an embodiment of the present application. A second display region 102 includes a transmissive region 500. The operating process of the second display region 102 includes a light-transmissive stage. At least in the light-transmissive stage, the transmissive region 500 allows the light to transmit through the display panel. In the present application, a camera is set below the second display region 102 of the display panel, and the transmissive region 500 is set in the second display region 102. When it is needed to turn on the camera function, the camera acquires external light through the transmissive region 500. When the camera function is off, the second display region 102 can be normally displayed, thereby achieving the full-screen display.

In addition, the second display region 102 further includes a transition region 103 located between the first display region 101 and the transmissive region 500. The second pixel circuit 120 is located in the transition region 103. The second display region 102 includes the transmissive region; therefore, to fully ensure the area of the transmissive region, the transition region 103 is set. Moreover, the second pixel circuit 120 is set in the transition region 103, fully ensuring the area of the transmissive region, thereby ensuring the camera function of the second display region 102.

In an embodiment, in the first display region 101, one first pixel circuit 110 provides a drive current for m1 light-emitting elements, and in the second display region, one second pixel circuit provides a drive current for m2 light-emitting elements, where $m1 \geq 1$, $m2 \geq 1$, and $m1 < m2$.

As described above, when the second display region 102 includes the transmissive region 500, to fully ensure the area of the transmissive region 500, the number of second display regions 102 and the area of the second display region 102 each need to be designed small enough. In some cases, the number of light-emitting elements driven by the second pixel circuit 120 may be set to be larger than the number of light-emitting elements driven by the first pixel circuit 110, thereby saving the area occupied by the second pixel circuit. Since the number of light-emitting elements driven by the first pixel circuit 110 and the number of light-emitting elements driven by the second pixel circuit 120 are different, magnitudes of drive currents generated by drive transistors of the pixel circuits are also different, resulting in that the bias states of the drive transistors are also different. Therefore, the bias states of the first pixel circuit 110 and the second pixel circuit 120 can be adjusted separately.

In some cases, the first pixel circuit 110 may include a bias adjustment module 14 for providing the bias adjustment signal, and the second pixel circuit 120 may not include the bias adjustment module 14 so that the area occupied by the second pixel circuit 120 may be further reduced. Moreover, the bias adjustment module 14 is not set in the second pixel circuit 120, so the bias adjustment signal line may not be connected to the second display region 102. In this manner, the trace space in the second display region 102 can be saved, and a bias adjustment signal bus does not need to be connected to the second display region 102 from the bezel of the display panel, thereby saving the bezel area. Therefore, in this case, the space occupied by the related traces and the second pixel circuit 120 can be fully reduced, and sufficient space can be reserved for the transmissive region 500 of the second display region 102.

In other cases, one of the first electrode or the second electrode of the drive transistor in the first pixel circuit 110 is connected to the bias adjustment module 14, and the other one of the first electrode or the second electrode of the drive transistor in the second pixel circuit 120 is connected to the bias adjustment module 14. After the structure of the pixel circuit is fixed, which electrode of the drive transistor is connected to the bias adjustment module 14 may affect the area occupied by the pixel circuit. Since the first display region 101 does not include the transmissive region 500, the connection mode conducive to fully ensuring the bias effect may be selected to connect the bias adjustment module 14. Since the second display region 102 includes the transmissive region 500, the connection mode conducive to reducing the area of the second pixel circuit 120 may be selected to connect the bias adjustment module 14. In this manner, the functional requirements of the first display region 101 and the second display region 102 can be fully ensured.

In addition, in an embodiment, the first pixel circuit 110 includes a first drive transistor and the second pixel circuit 120 includes a second drive transistor. The width-to-length ratio of the first drive transistor is R1, and the width-to-length ratio of the second drive transistor is R2, where R1<R2.

As described above, the number of light-emitting elements driven by the first pixel circuit 110 is smaller than the number of light-emitting elements driven by the second pixel circuit 120. Therefore, when the light-emitting elements have the same brightness, the drive current generated in the second pixel circuit 120 is larger than the drive current generated in the first pixel circuit 110. To ensure the capability of generating the drive current of the second pixel circuit 120, the width-to-length ratio of the drive transistor in the second pixel circuit 120 is set to be larger. The larger the width-to-length ratio, the stronger the drive capability, thereby fully ensuring the display effect of the second display region 102.

In an embodiment, in at least one stage of the operating of the display panel 100, the data refresh frequency within the first display region 101 is F1 and the data refresh frequency within the second display region 102 is F2, where F1<F2.

With more and more functions integrated into the display panel, different regions in the display panel are often required to have different display functions. For example, some regions are configured to display pages of games or videos, and some regions are configured to display pages of words and time information. Different data refresh frequencies are required for different display requirements. Typically, a higher data refresh frequency is required for the regions displaying the pages of games or videos, and a lower data refresh frequency can meet the requirements of the regions displaying the pages of words and time information, thereby saving the power. The bias problem of the drive transistor is mainly caused by an inverted electric field generated by the voltage difference among the gate, source, and drain of the drive transistor in a light-emitting stage. When the pixel circuit displays in the low-frequency state, voltages among the gate, source, and drain of the drive transistor are maintained in one state for a long time. Therefore, if the inverted electric field occurs, the bias problem caused by the inverted electric field will be relatively severe. Thus, when F1<F2, it may be set that the preset electrode 200 of the drive transistor of the first pixel circuit 110 is connected to the bias adjustment module 14, and the preset electrode 200 of the drive transistor of the second pixel circuit 120 is connected to no bias adjustment module 14. In this manner, the bias adjustment is performed only in the region in which data is refreshed at a low frequency, and the bias adjustment is not performed in the region in which data is refreshed at a high frequency so that not only the power and space of the panel can be saved, but also the bias adjustment can be performed in the low-frequency region.

Another aspect of the present application provides a display device including the display panel in any one of embodiments described above.

Figure 13:
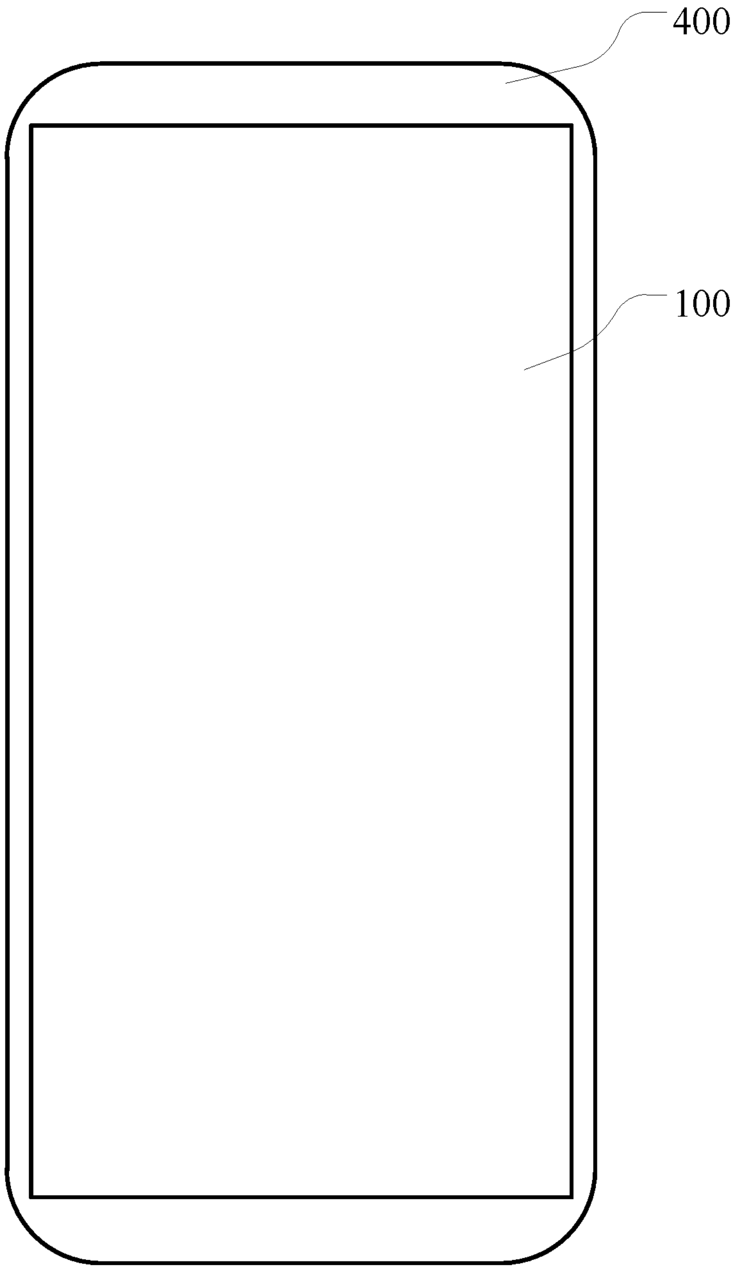
FIG. 13 is a schematic diagram of a display device according to an embodiment of the present application.

Referring to FIG. 13, FIG. 13 is a schematic diagram of a display device according to an embodiment of the present application. A display device 400 includes the display panel 100. The display panel 100 is the display panel described in any one of embodiments described above. The display device may be a mobile phone, a television, a laptop, a flat panel display device, a smart wearable display device, etc., and is not specifically limited in the embodiment.

In an embodiment, when the display device provided by the present application is an under-screen camera display device, the second display region 102 includes a transmissive region 500. The operating process of the second display region 102 includes a light-transmissive stage. At least in the light-transmissive stage, the transmissive region 500 allows light to transmit through the display panel. The display device 400 includes a functional device disposed corresponding to the transmissive region 500 of the second display region 102. In the light-transmissive stage, the functional device may emit and receive the light through the transmissive region. In an embodiment, the functional device is a camera. As described above, the camera is set below the display region having the transmissive region so that the full screen function can be achieved.

It can be seen from the above description that the present application provides the display panel and the display device, the display panel 100 includes a first display region 101 and a second display region 102, the preset electrode of the first pixel circuit 110 for providing the drive current for the light-emitting element in the first display region 101 is connected to the bias adjustment module 14, and the preset electrode of the second pixel circuit 120 for providing the drive current for the light-emitting element in the second display region 102 is connected to no bias adjustment module 14. Since the bias adjustment signal is a signal received by the pixel circuit 10 for adjusting the bias state of the drive transistor, whether to receive the bias adjustment signal and to which electrode the bias adjustment signal is input both affect the operating process and the structure configuration of the pixel circuit 10. If the first display region 101 and the second display region 102 in the display panel 100 each have different requirements to achieve different functions, the case of including the transmissive region is different, the width-to-length ratio of the drive transistor of the pixel circuit is different, and the number of light-emitting elements driven by the pixel circuit is different, and to save the number of bias adjustment signal lines and the like, the setting position of the bias adjustment module and whether to set the bias adjustment module are each separately and independently designed in the first pixel circuit 110 and the second pixel circuit 120, so as to better meet the respective display requirements of the first display region 101 and the second display region 102.

The preceding content is a further detailed description of the present disclosure in conjunction with the specific preferred embodiments, and the specific implementation of the present disclosure is not limited to the description. For those skilled in the art to which the present disclosure pertains, a number of simple deductions or substitutions may be made without departing from the concept of the present disclosure and should fall within the protection scope of the present disclosure.

What is claimed is:

1. A display panel, comprising:

a first display region and a second display region; and pixel circuits comprising a first pixel circuit and a second pixel circuit, wherein the first pixel circuit is configured to provide a drive current for a light-emitting element in the first display region, and the second pixel circuit is configured to provide a drive current for a light-emitting element in the second display region;

wherein the pixel circuits further comprise at least one bias adjustment module, wherein each of the at least one bias adjustment module is configured to provide a bias adjustment signal for a respective one drive transistor, a preset electrode of a drive transistor in the first pixel circuit is connected to one bias adjustment module, and a preset electrode of a drive transistor in the second pixel circuit is connected to no bias adjustment module.

2. The display panel according to claim 1, wherein each of the pixel circuits comprises a data write module, a drive module, and a compensation module, wherein the drive module comprises a drive transistor configured to provide a drive current for a light-emitting element of the display panel;

the data write module is connected to a first electrode of the drive transistor and is configured to provide a data signal for the drive transistor; and the compensation module is connected between a gate of the drive transistor and a second electrode of the drive transistor and is configured to compensate a threshold voltage of the drive transistor.

3. The display panel according to claim 2, wherein the preset electrode is the first electrode of the drive transistor or the second electrode of the drive transistor, and both the first electrode of the drive transistor in the second pixel circuit and the second electrode of the drive transistor in the second pixel circuit are connected to no bias adjustment module.

4. The display panel according to claim 2, wherein the preset electrode is the first electrode of the drive transistor, and the second electrode of the drive transistor in the second pixel circuit is connected to one bias adjustment module; or the preset electrode is the second electrode of the drive transistor, and the first electrode of the drive transistor in the second pixel circuit is connected to one bias adjustment module.

5. The display panel according to claim 4, wherein the display panel further comprises a bias adjustment signal line configured to transmit the bias adjustment signal; and the bias adjustment signal line extends in a first direction, the first pixel circuit and the second pixel circuit are located on two sides of the bias adjustment signal line, respectively, and the bias adjustment signal line is configured to simultaneously provide the bias adjustment signal to both the first pixel circuit and the second pixel circuit.

6. The display panel according to claim 1, wherein the preset electrode of the drive transistor in the second pixel circuit is connected to a virtual bias adjustment module, and the virtual bias adjustment module is configured to do not provide the bias adjustment signal for the drive transistor in the second pixel circuit.

7. The display panel according to claim 1, wherein the first display region comprises a light-emitting element that emits light of a first color, the second display region comprises a light-emitting element that emits light of a second color, and the first color and the second color are different.

8. The display panel according to claim 7, wherein the light of the first color has a wavelength of $\lambda 1$, and the light of the second color has a wavelength of $\lambda 2$, wherein $\lambda 1 < \lambda 2$.

9. The display panel according to claim 1, wherein the second display region comprises a transmissive region, an operating process of the second display region comprises a light-transmissive stage, and at least in the light-transmissive stage, the transmissive region allows light to transmit through the display panel.

10. The display panel according to claim 9, wherein the second display region further comprises a transition region located between the first display region and the transmissive region, and the second pixel circuit is located in the transition region.

11. The display panel according to claim 1, wherein in the first display region, one first pixel circuit is configured to provide drive currents for m1 light-emitting elements, and in the second display region, one second pixel circuit is configured to provide drive currents for m2 light-emitting elements, wherein $m1 \geq 1$, $m2 \geq 1$, and $m1 < m2$.

12. The display panel according to claim 11, wherein $m1=1$; and $m2=2$, $m2=3$, or $m2=4$.

13. The display panel according to claim 1, wherein the first pixel circuit comprises a first drive transistor, the second pixel circuit comprises a second drive transistor, a width-to-length ratio of the first drive transistor is R1, and a width-to-length ratio of the second drive transistor is R2, wherein $R1 < R2$.

14. The display panel according to claim 1, wherein in at least one stage of operating of the display panel, a data refresh frequency within the first display region is F1, a data refresh frequency within the second display region is F2, wherein $F1 < F2$.

15. A display device, comprising: a display panel which comprises:

a first display region and a second display region; and pixel circuits comprising a first pixel circuit and a second pixel circuit, wherein the first pixel circuit is configured to provide a drive current for a light-emitting element in the first display region, and the second pixel circuit is configured to provide a drive current for a light-emitting element in the second display region;

wherein the pixel circuits further comprise at least one bias adjustment module, wherein each of the at least one bias adjustment module is configured to provide a bias adjustment signal for a respective one drive transistor, a preset electrode of a drive transistor in the first pixel circuit is connected to one bias adjustment module, and a preset electrode of a drive transistor in the second pixel circuit is connected to no bias adjustment module.

16. The display device according to claim 15, wherein the second display region comprises a transmissive region, an operation process of the second display region comprises a light-transmissive stage, and at least in the light-transmissive stage, the transmissive region allows light to transmit through the display panel; and the display device further comprises a functional device disposed corresponding to the transmissive region of the display panel, and in the light-transmissive stage, the functional device is capable of emitting and receiving light through the transmissive region.

17. The display device according to claim 15, wherein each of the pixel circuits comprises a data write module, a drive module, and a compensation module, wherein the drive module comprises a drive transistor configured to provide a drive current for a light-emitting element of the display panel;

the data write module is connected to a first electrode of the drive transistor and is configured to provide a data signal for the drive transistor; and the compensation module is connected between a gate of the drive transistor and a second electrode of the drive transistor and is configured to compensate a threshold voltage of the drive transistor.

18. The display device according to claim 17, wherein the preset electrode is the first electrode of the drive transistor or the second electrode of the drive transistor, and both the first electrode of the drive transistor in the second pixel circuit and the second electrode of the drive transistor in the second pixel circuit are connected to no bias adjustment module.

19. The display device according to claim 17, wherein the preset electrode is the first electrode of the drive transistor, and the second electrode of the drive transistor in the second pixel circuit is connected to one bias adjustment module; or the preset electrode is the second electrode of the drive transistor, and the first electrode of the drive transistor in the second pixel circuit is connected to one bias adjustment module.

20. The display device according to claim 19, wherein the display panel further comprises a bias adjustment signal line configured to transmit the bias adjustment signal; and the bias adjustment signal line extends in a first direction, the first pixel circuit and the second pixel circuit are located on two sides of the bias adjustment signal line, respectively, and the bias adjustment signal line is configured to simultaneously provide the bias adjustment signal to both the first pixel circuit and the second pixel circuit.

* * * * *